Nov. 4, 1924.  1,514,036
G. H. L. DEBAECKER
SUCTION DEVICE FOR LIFTING AND TRANSPORTING ARTICLES
Filed Nov. 13, 1923   2 Sheets-Sheet 1

Inventor
Georges Henri Léon Debaecker

Nov. 4, 1924. 1,514,036
G. H. L. DEBAECKER
SUCTION DEVICE FOR LIFTING AND TRANSPORTING ARTICLES
Filed Nov. 13, 1923   2 Sheets-Sheet 2
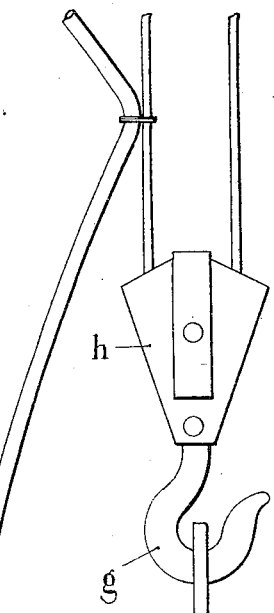
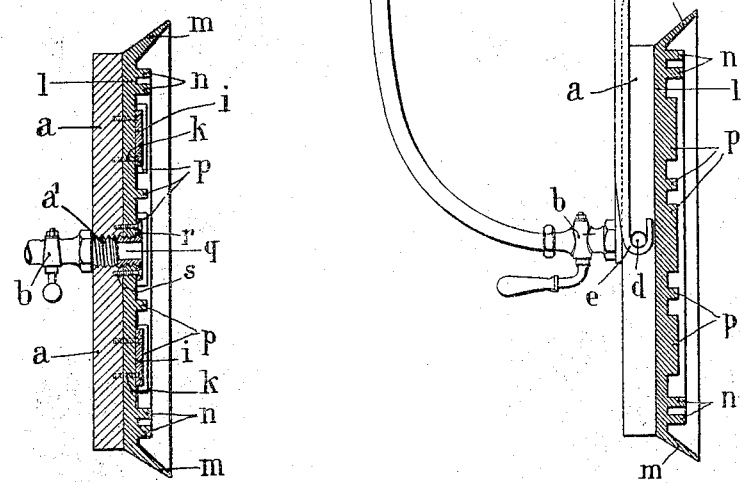
Inventor
Georges Henri Léon Debaecker.
by Langner, Parry, Card + Langner
Attys.

Patented Nov. 4, 1924.

1,514,036

UNITED STATES PATENT OFFICE.

GEORGES HENRI LÉON DEBAECKER, OF SAS-DE-GAND, HOLLAND, ASSIGNOR TO SOCIETE DITE MANUFACTURES DES GLACES & PRODUCTS CHIMIQUES DE ST. GOBAIN, CHAUNY & CIREY, OF PARIS, FRANCE, A CORPORATION OF FRANCE.

SUCTION DEVICE FOR LIFTING AND TRANSPORTING ARTICLES.

Application filed November 13, 1923. Serial No. 674,568.

*To all whom it may concern:*

Be it known that I, GEORGE HENRI LÉON DEBAECKER, citizen of the Republic of France, residing at Sas-de-Gand, Holland, have invented certain new and useful Improvements in Suction Devices for Lifting and Transporting Articles, of which the following is a specification.

The suction devices hitherto proposed for lifting and transporting sheets or slabs of glass, metal and other materials, may be divided into two kinds: the devices intended to lift sheets of reduced size and comprising one or two suction chambers, and the devices intended to lift larger surfaces and comprising a frame provided with a more or less large number of suction chambers connected together by a system of tubes and adapted to operate altogether or in any desired number.

I have found that it is possible to notably reduce the number of suction devices and even to lift sheets of glass of large sizes by means of a single suction device.

This single suction device has, relatively to the apparatus with multiple suction chambers, the following advantages: it may be more easily applied to the article to be lifted; it allows of a more rapid establishment of the vacuum between the suction device and the article to be lifted; it diminishes the dangers of leakages of air, which are so much the more important as there are a larger number of suction devices, of pipings connecting the same and of junctions or of cocks on said suction devices and pipings. To that end, it is necessary that the single suction device should possess a sufficiently large bearing surface, that it should be sufficiently flexible to fit tightly and evenly on the surface of the article to be lifted, that it should have internal projections, in a sufficient number, to act as stops for the sheet or similar article to be lifted and so to avoid the deformation and the possible breaking thereof; that the said projections should be of small area in order to provide the largest possible surface to the action of the vacuum; that the spaces between said projections should allow the free circulation of air; that the internal capacity of the suction device, i. e., the capacity in which the vacuum is to be produced, should be as reduced as possible; that all causes of leakage should be suppressed.

My suction device consists of a single and continuous india rubber plate, comprising a peripheral part in the shape of a soft lip, one or more peripheral strips or crowns, arranged within said lip but less projecting than the same upon the plate, and within said single or multiple crowns, straight or curved ribs, still less projecting than the said crown or crowns, spaced from the same and from each other, so as to limit the crushing of the india-rubber plate upon the article to be lifted and transported, and to facilitate the circulation of air within the suction device, the said india-rubber plate being fastened to a carrier plate, which is secured, preferably pivotally, to a lifting apparatus and which is connected, preferably in its central part, to a pipe, provided with a cock or other controlling means adapted to put the suction device into communication either with the atmosphere, or with a vacuum reservoir or vacuum producing apparatus.

The annexed drawings show, merely by way of example, a form of construction of my suction device:

Fig. 2 is a side elevation, in part in section on line 2—2 of Fig. 1.

Fig. 3 is a section on line 3—3 of Fig. 1.

Figure 4:
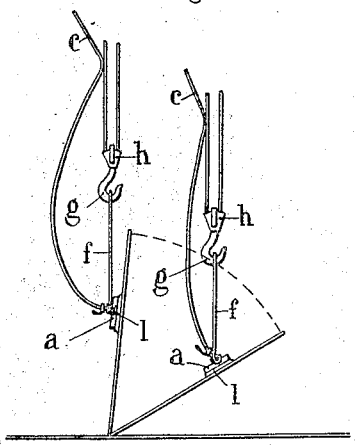
Fig. 4 shows the lifting of a sheet by means of the said suction device.
Figure 1:
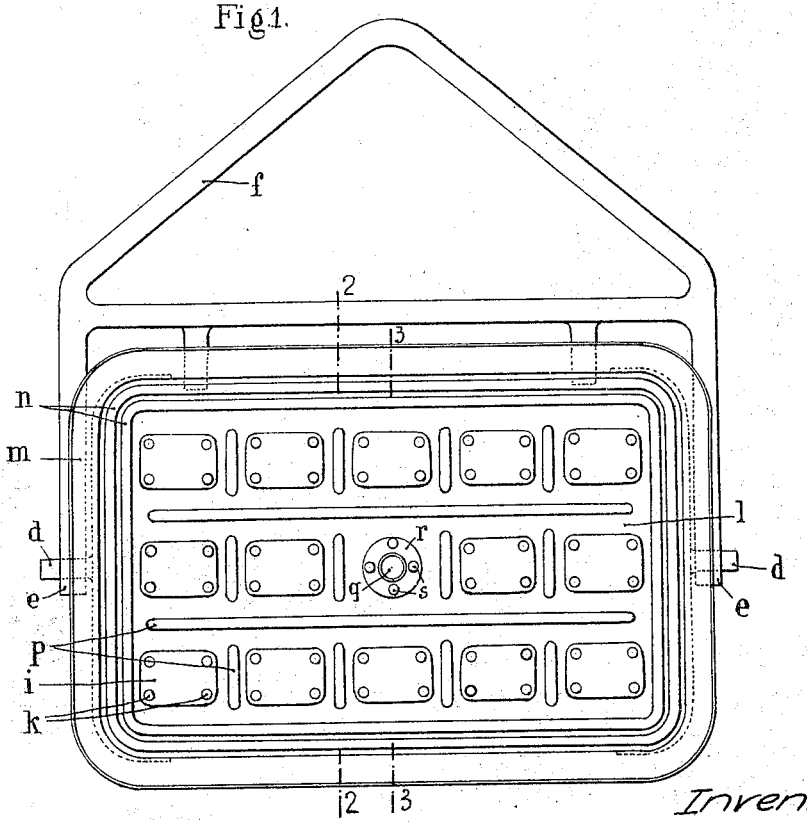
Fig. 1 is a front elevation thereof.

The suction device, shown in the drawings, consists of a carrier plate $a$, to the central part of which is threaded a tubular fitting $a^1$, provided with a three-way cock $b$, upon which is secured the flexible pipe or hose $c$, which allows of putting the suction device into communication either with the vacuum reservoir or vacuum producing apparatus (not shown) or with the air. The carrier plate $a$ is provided with two journal pins $d$, engaged in the end hooks $e$ of the arms of a frame $f$ supported by the hook $g$ of a pulley block $h$. To the carrier plate $a$ is fastened, by means of plates $i$ and of screws or pins $k$, an integral and continuous recessed india-rubber plate $l$, having in plan any suitable shape, but preferably rectangular shape. The peripheral part of said plate is in the shape of a soft or flexible projecting lip, *m*. Within said lip is provided a double strip or crown *n*, also of peripheral form, but less projecting on the surface of the plate *l* than the lip *m*. Within the said double crown *n* are provided, upon the plate *l*, narrow ribs or strips *p*, acting as stops and still less projecting than the crown *n*; these ribs are spaced from the crown *n* and from each other, so as to facilitate the circulation of air within the suction device.

The inlet and outlet of air are effected through a port *q*, provided in the india-rubber plate *l* and in the carrier plate *a*, and constituting an extension of the port of the cock bush and plug; the edges of the india-rubber plate around the port *q* are pressed upon the carrier plate *a* by a washer *r* and screws or pins *s*, similar to the fastening means *i* and *k* above described.

The said suction device operates as follows:

The pulley block *h* carrying the suction device is brought, with the piping *c* connecting the same to the vacuum reservoir or apparatus, in the neighbourhood of the article to be lifted. The suction device, which may pivot on its journals *d* engaged in the hooks *e* of the frame *f*, is applied to the free bearing surface of the article to be lifted, whatever the inclination thereof may be. At the moment where the vacuum is established by the actuating of the three-way cock *b*, the soft lip *m* of the plate *l* tends to be crushed on to the surface of the article; the double crown *n* and the ribs *p* abut against said surface and thus limit the contact therewith, so as to allow of the air to circulate freely around said ribs and to escape to the vacuum reservoir or apparatus. When the vacuum is established, the suction device and the article adhering thereto may be lifted and transported to the desired place. The three-way cock *b* may then be again actuated, so as to allow the inlet of air into the suction device and thus separate the article therefrom. The suction device is thus free and may be transported to another place, and the same working may take place again in a minimum of time.

What I claim is:

A suction device for lifting and transporting articles, and more particularly sheets or slabs of glass, metal and other materials, comprising a carrier plate,—a single and continuous india-rubber plate fastened thereto,—a projecting soft lip at the peripheral part of said plate,—a number of peripheral crowns arranged within said lip but less projecting than the same upon the india-rubber plate,—and, within said crowns, a number of projections still less projecting than the said crowns, said projections being spaced from said crowns and from each other and adapted to limit the crushing of the india-rubber plate upon the article to be lifted and transported, and adapted to facilitate the circulation of air within the suction device,—a lifting apparatus,—means for securing the carrier plate to the same,—a piping connected to the suction device through the carrier plate, and means upon said piping for controlling the communication of the suction device with the atmosphere and with a vacuum producing means.

In testimony whereof I have signed my name to this specification.

GEORGES HENRI LÉON DEBAECKER.

Witnesses:
J. ARMENGAND AÎNÉ,
W. DEFÉVRIMONT.